US008538151B2

United States Patent
Shimamura et al.

(10) Patent No.: US 8,538,151 B2
(45) Date of Patent: Sep. 17, 2013

(54) BUILDING ROOF OUTLINE RECOGNIZING DEVICE, BUILDING ROOF OUTLINE RECOGNIZING METHOD, AND BUILDING ROOF OUTLINE RECOGNIZING PROGRAM

(75) Inventors: Hideki Shimamura, Tokyo (JP); Lin Zhu, Chiba (JP)

(73) Assignee: Pasco Corporation, Tokyo (JP)

( * ) Notice: Subject to any disclaimer, the term of this patent is extended or adjusted under 35 U.S.C. 154(b) by 336 days.

(21) Appl. No.: 12/988,740

(22) PCT Filed: Apr. 21, 2009

(86) PCT No.: PCT/JP2009/057901
§ 371 (c)(1),
(2), (4) Date: Oct. 20, 2010

(87) PCT Pub. No.: WO2009/131108
PCT Pub. Date: Oct. 29, 2009

(65) Prior Publication Data
US 2011/0033110 A1 Feb. 10, 2011

(30) Foreign Application Priority Data
Apr. 23, 2008 (JP) ................................. 2008-112874

(51) Int. Cl.
*G06K 9/34* (2006.01)
*G06K 9/00* (2006.01)
*G06K 9/48* (2006.01)

(52) U.S. Cl.
USPC ........................... 382/173; 382/154; 382/199

(58) Field of Classification Search
None
See application file for complete search history.

(56) References Cited

U.S. PATENT DOCUMENTS

| 5,087,916 A * | 2/1992 | Metzdorff et al. ............... 342/64 |
| 7,133,551 B2 * | 11/2006 | Chen et al. .................... 382/154 |
| 7,728,833 B2 * | 6/2010 | Verma et al. .................. 345/420 |
| 2003/0014224 A1 * | 1/2003 | Guo et al. ......................... 703/1 |
| 2004/0263514 A1 | 12/2004 | Jin et al. |

FOREIGN PATENT DOCUMENTS

| EP | 1 906 354 A1 | 4/2008 |
| JP | A-2001-357380 | 12/2001 |
| JP | A-2002-74323 | 3/2002 |
| JP | A-2002-366977 | 12/2002 |

(Continued)

OTHER PUBLICATIONS

Jin, Xiaoying et al; Automated Building Extraction from High-Resolution Satellite Imagery in Urban Areas Using Structural, Contextual, and Spectral Information; Aug. 2005; EURASIP Journal on Applied Signal Processing; vol. 14; pp. 1-11.*

(Continued)

*Primary Examiner* — Utpal Shah
(74) *Attorney, Agent, or Firm* — Oliff & Berridge, PLC

(57) ABSTRACT

Provided is a building roof outline recognition device which facilitates automation. A small-building candidate region is extracted based on normalized DSM data using a region segmentation method. By using the building candidate region as a marker and further using height information included in the normalized DSM data and the like, a building region is extracted using a region growing method. While referencing the height information, from among edges appearing in the orthoimage, edges fitting with an outer shape of the building region are extracted as an outer shape of the roof when viewed from above. Further, for a building judged to have a slanted roof, a roof structure line which is the boundary between the roof surfaces is extracted from the building region, and a three-dimensional structure of the building roof outline is determined from the roof outer shape and the roof structure line.

16 Claims, 8 Drawing Sheets

(56) References Cited

FOREIGN PATENT DOCUMENTS

| | | |
|---|---|---|
| JP | A-2003-323640 | 11/2003 |
| JP | A-2003-344048 | 12/2003 |
| JP | A-2004-212334 | 7/2004 |
| JP | A-2004-341422 | 12/2004 |
| JP | A-2006-323608 | 11/2006 |
| JP | A-2007-3244 | 1/2007 |

OTHER PUBLICATIONS

Sohn, G., Extraction of Buildings From High-Resolution Satellite Data and Lidar, Jul. 2004, 20th Congress WGIII/4 Automated Object Extraction, vol. 35, pp. 1-7.*

Tolt et al, Segmentation and classification of airborne laser scanner data for ground and building detection, 2006, Proceedings of SPIE, vol. 6214, pp. 1-9.*

Babak Ameri and Dieter Fritsch, "Automatic 3D Building Reconstruction Using Plane-Roof Structures", Proc. of ASPRS Annual Conference, 2000, pp. 22-26.*

International Search Report dated Jun. 2, 2009 in International Application No. PCT/JP2009/057901.

International Preliminary Report on Patentability issued in Application No. PCT/JP2009/057901; Dated Dec. 13, 2010.

* cited by examiner

FIG.2
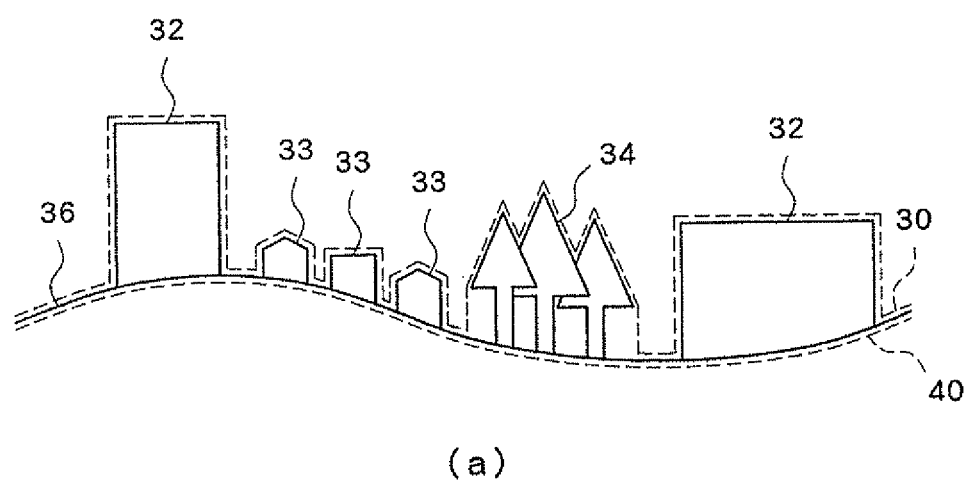
(a)
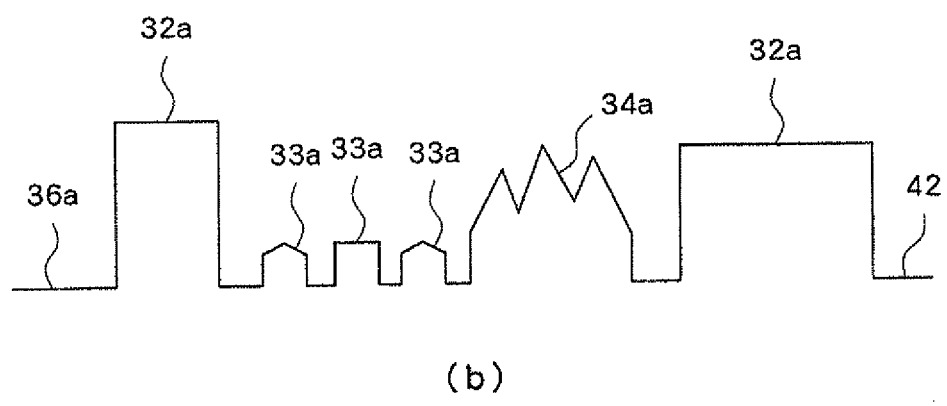
(b)

FIG.3
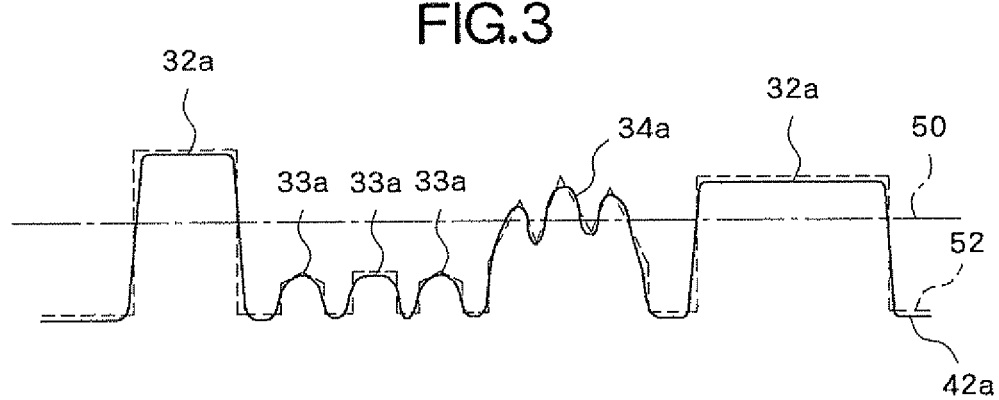
(a)
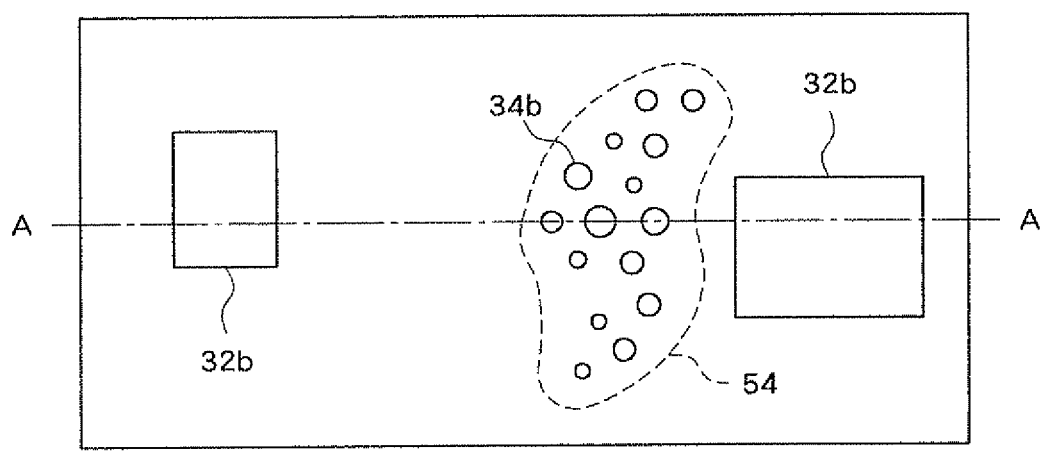
(b)
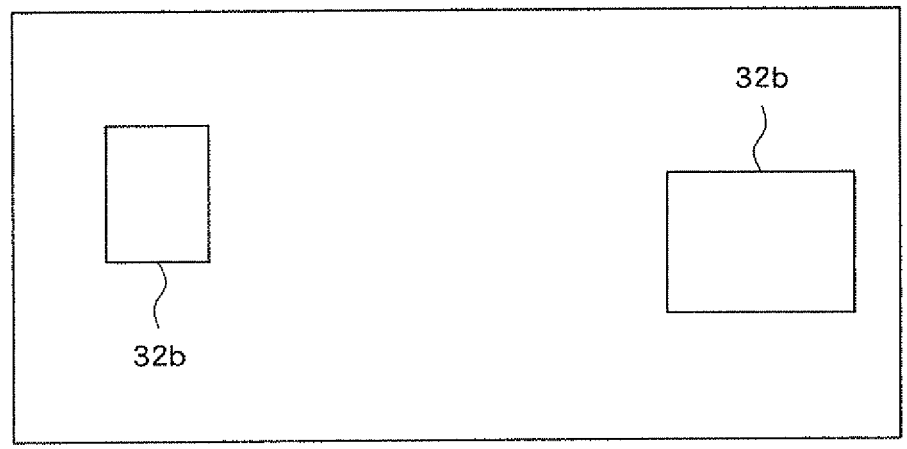
(c)

FIG.4
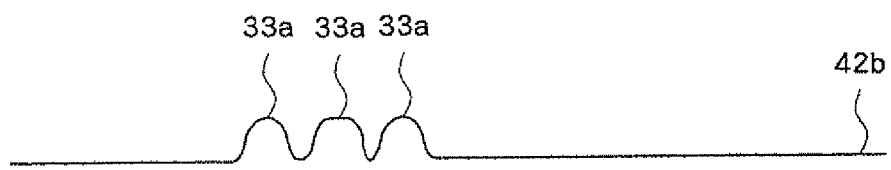
(a)
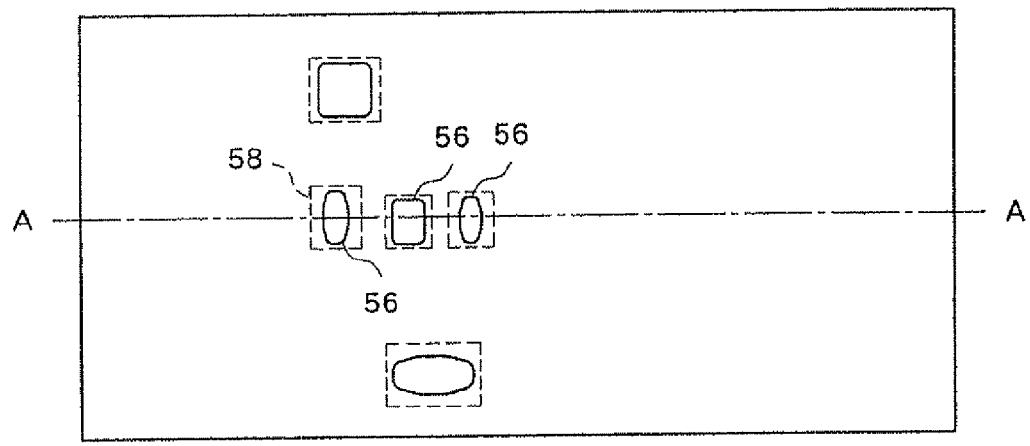
(b)
FIG.5
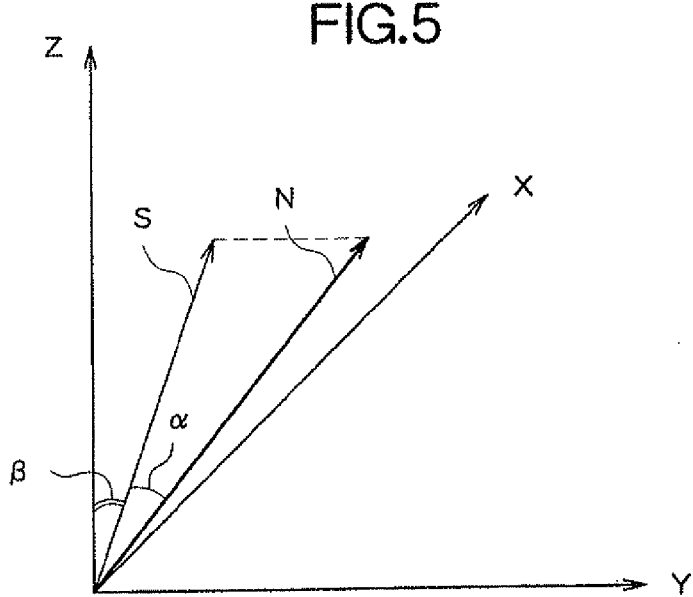

FIG.6
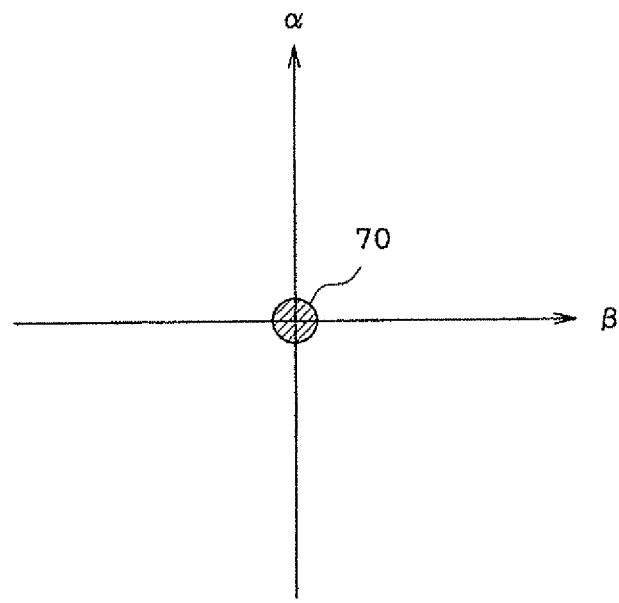
(a)
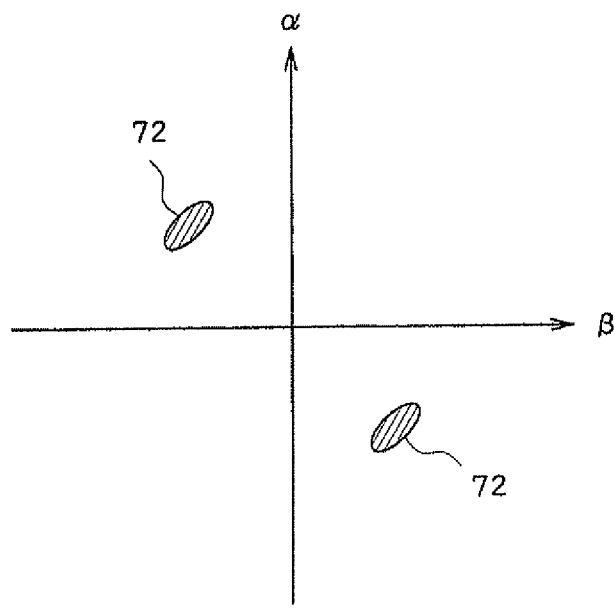
(b)

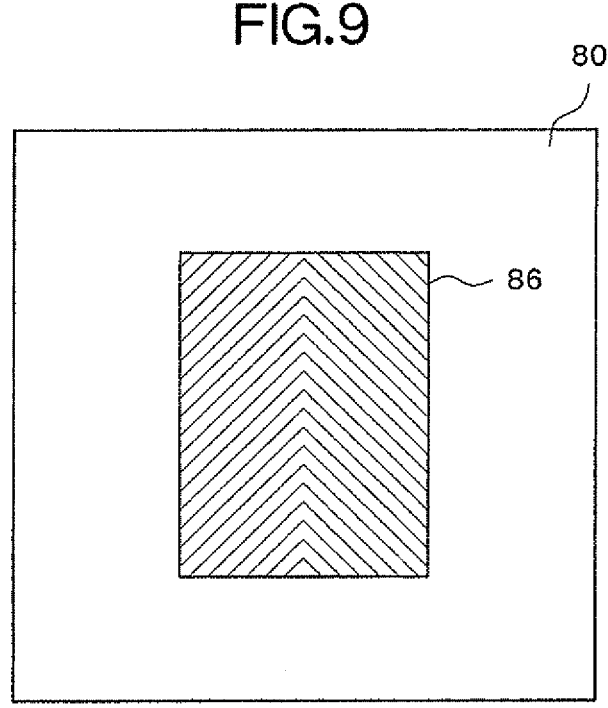
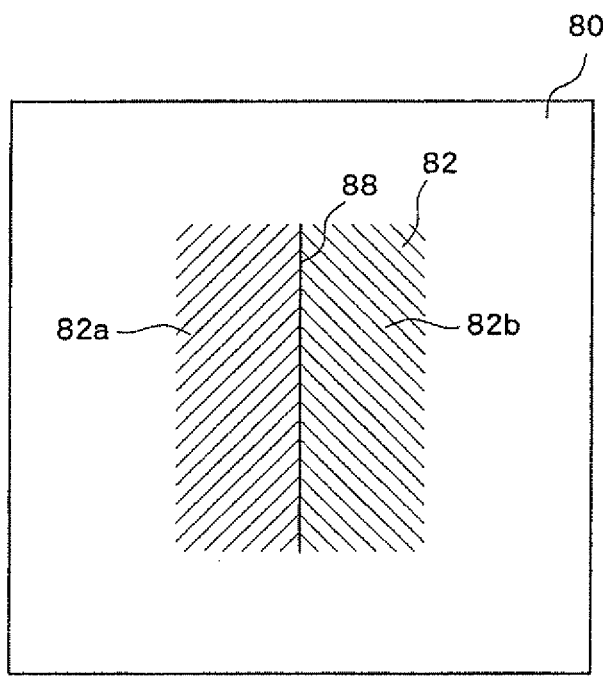

BUILDING ROOF OUTLINE RECOGNIZING DEVICE, BUILDING ROOF OUTLINE RECOGNIZING METHOD, AND BUILDING ROOF OUTLINE RECOGNIZING PROGRAM

TECHNICAL FIELD

The present invention relates to a building roof outline recognition device, a building roof outline recognition method, and a building roof outline recognition program.

BACKGROUND ART

In the creation of an urban model or the like, an outline of a roof (including a rooftop) of a building is recognized by using high-resolution aerial photograph imagery taken from an aircraft or the like. Conventional methods therefor include a method in which a structure of a building roof outline is determined from a stereographic image by a worker using a stereo plotter, a semiautomatic recognition method in which a worker specifies a range in which the outline of the building exists and the building roof outline is generated within the range by image recognition processing, and a method in which the worker recognizes the building roof outline from an orthoimage (orthographic projection image) by heads-up digitizing.

Further proposed are a method of automatically recognizing the building roof outline by using an aerial photograph image and a method of automatically recognizing the building roof outline by using digital surface model (DSM) data.

PRIOR ART DOCUMENT

Patent Document

Patent Document 1: JP 2003-323640 A

DISCLOSURE OF THE INVENTION

Problems to be Solved by the Invention

The above-mentioned conventional methods raise a problem of low work efficiency because manual work is necessary for processing of recognizing building roof outlines of individual buildings. In addition, the manually-processed recognition processing having quality depending upon a worker's skill raises a problem that its quality is hard to guarantee.

Meanwhile, the aerial photograph image includes various kinds of information other than the building roof outline, which leads to a problem that, for example, it is not easy to accurately recognize the outline from the aerial photograph image. In contrast, the DSM data is sophisticated information, but has a problem of difficulty in obtaining a sufficient number of sampling points at which data is obtained for the recognition of the building roof outline. Particularly in a densely built-up urban region, a rough DSM makes it difficult to recognize the outline of the building roof with satisfactory accuracy.

The present invention has been made in order to solve the above-mentioned problems, and an object thereof is to provide a building roof outline recognition device, a building roof outline recognition method, and a building roof outline recognition program, which facilitate automation.

Means for Solving the Problems

The present invention provides a building roof outline recognition device including: a marker region extraction unit for extracting a region which is included in a roof as a marker region for each building from a recognition target region of a building roof outline based on surface data that is captured from above and that represents a height above sea level of a ground surface including a feature; a roof candidate region extraction unit for extracting, as a roof candidate region, a region having commonality with the marker region with regard to the surface data and an aerial photograph image by a region growing method with the marker region set as a core; and a periphery boundary shaping unit for extracting an edge fitting with an outer shape of the roof candidate region from among edges appearing in the aerial photograph image, and determining a periphery boundary that is the building roof outline.

According to a preferred aspect of the present invention, the roof candidate region extraction unit judges presence/absence of the commonality based on the surface data and color information and image texture information included in the aerial photograph image, and determines the roof candidate region.

According to another preferred aspect of the present invention, the marker region extraction unit includes region segmentation processing of extracting a projecting portion having a height corresponding to the building among projecting portions appearing on the ground surface as the marker region by region segmentation using a watershed method based on the surface data.

The building roof outline recognition device according to the present invention may further include: a roof shape distinguishing unit for distinguishing the roof of the building between a flat roof formed of a flat roof surface and a slanted roof having a slanted surface based on the surface data on the projecting portion corresponding to the building for which the marker region is extracted in the region segmentation processing; a roof structure line extraction unit for extracting, as a roof structure line, a boundary between a plurality of roof surfaces that may be included in the slanted roof based on the edges appearing in the aerial photograph image within the periphery boundary for the building including the slanted roof; and a slanted roof outline construction unit for constructing a three-dimensional structure of the building roof outline of the slanted roof based on the periphery boundary and the roof structure line.

Further, in the building roof outline recognition device according to the present invention, the marker region extraction unit may include: a large-building region extraction unit for determining the marker region for a large building based on a region within the recognition target region, in which the surface data exceeds a predetermined threshold value, prior to the region segmentation processing; and a small-building region extraction unit for performing the region segmentation processing on a region within the recognition target region excluding the marker region for the large building, and determining the marker region for a small building that is a low-rise building at a height equal to or smaller than a height corresponding to the predetermined threshold value.

According to a preferred aspect of the present invention, the building roof outline recognition device further includes a vegetation region extraction unit for extracting a vegetation region based on the aerial photograph image, and the marker region extraction unit performs each processing on a region excluding the vegetation region from the recognition target region.

Further, the building roof outline recognition device according to the present invention may further include a normalizing processing unit for generating normalized surface data representing a height of the feature by subtracting a height above the sea level of a ground surface excluding the feature from the surface data. The marker region extraction unit may extract the marker region based on the normalized surface data, and the roof candidate region extraction unit may use the normalized surface data for extracting the roof candidate region.

According to the present invention, a building roof outline recognition method or a building roof outline recognition program includes: a marker region extraction step of extracting a region which is included in a roof as a marker region for each building from a recognition target region of a building roof outline based on surface data that is captured from above and that represents a height above sea level of a ground surface including a feature; a roof candidate region extraction step of extracting, as a roof candidate region, a region having commonality with the marker region with regard to the surface data and an aerial photograph image by a region growing method with the marker region set as a core; and a periphery boundary shaping step of extracting an edge fitting with an outer shape of the roof candidate region from among edges appearing in the aerial photograph image, and determining a periphery boundary that is the building roof outline.

Effect of the Invention

According to the present invention, the building roof outline may be automatically recognized with satisfactory accuracy by combining height information of DSM data which is the surface data and high-resolution information obtained from the aerial photograph image (such as pixel value spectral information and texture information), which have mutually different natures, with each other. By realizing automation, time required for recognition of the building roof outline may be reduced, and the quality may be ensured.

BRIEF DESCRIPTION OF THE DRAWINGS

FIGS. 2(a) and 2(b) Schematic diagrams illustrating normalization processing.

FIGS. 3(a) to 3(c) Schematic diagrams illustrating extraction processing for a large-building candidate region.

FIGS. 4(a) and 4(b) Schematic diagrams illustrating extraction processing for a small-building candidate region.

FIG. 5 A schematic diagram illustrating a polar coordinate system used in judgment processing for a slanted roof.

FIGS. 6(a) and 6(b) Schematic diagrams illustrating examples of a two-dimensional histogram in an $\alpha\beta$-plane.

FIG. 9 A schematic diagram displaying a building boundary overlaid on the orthoimage of the low-rise building.

FIG. 10 A schematic diagram displaying a roof structure line overlaid on the orthoimage of the low-rise building.

BEST MODE FOR CARRYING OUT THE INVENTION

Hereinafter, description is made of an embodiment of the present invention with reference to the drawings.

Figure 1:
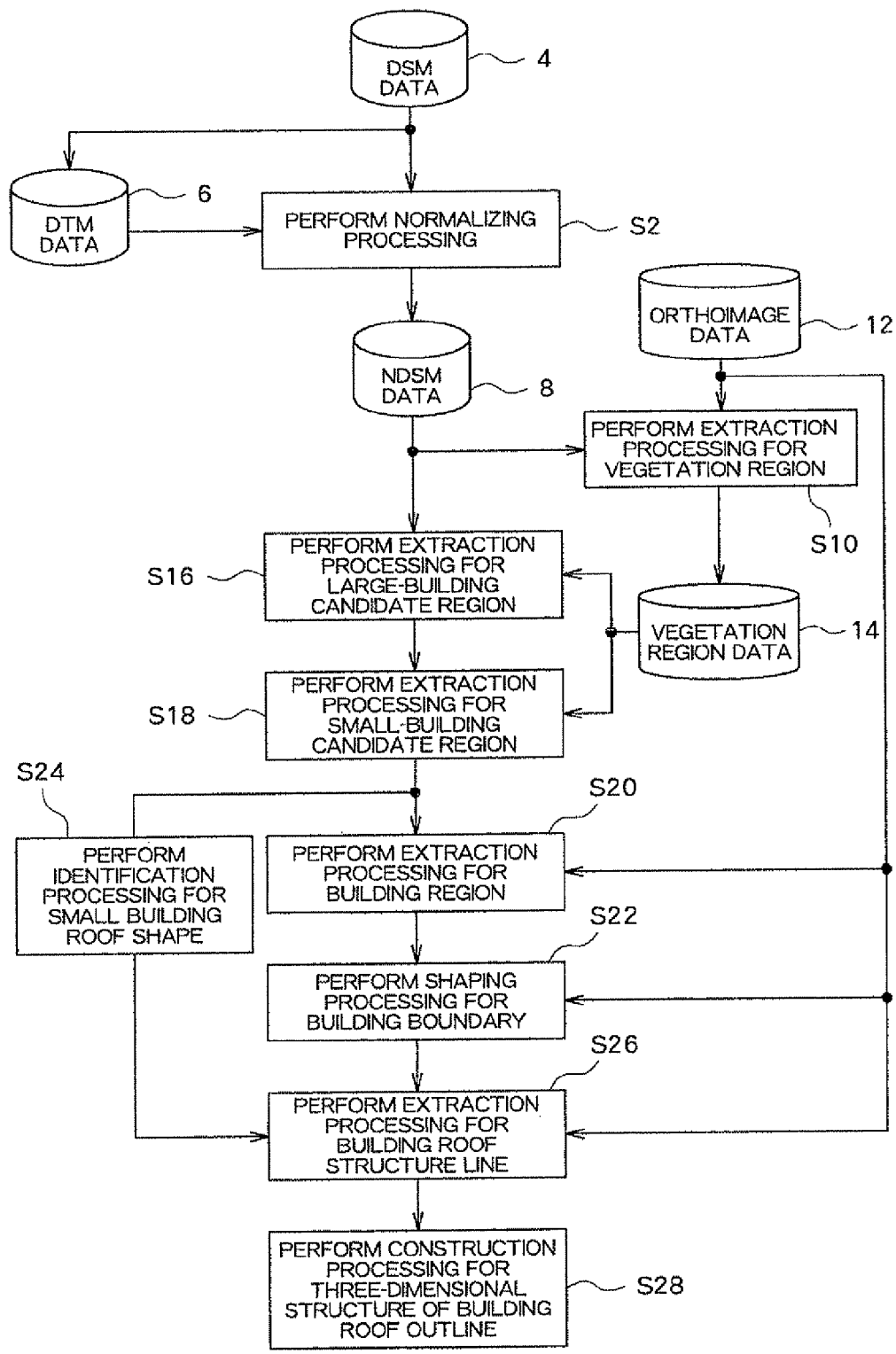
FIG. 1 A flowchart illustrating a flow of an outline of processing for a building roof outline recognition method according to an embodiment of the present invention.

FIG. 1 is a flowchart illustrating a flow of an outline of processing for a building roof outline recognition method according to this embodiment. In normalizing processing S2, DSM data 4 which is surface data is normalized. The processing S2 is performed by using the DSM data 4 and digital terrain model (DTM) data 6 to generate normalized digital surface model (NDSM) data 8 which is normalized surface data.

In extraction processing S10 for a vegetation region, orthoimage data 12 obtained based on an aerial photograph image taken from an aircraft or the like and the NDSM data 8 are used to identify a vegetation region within an orthoimage. Accordingly, vegetation region data 14 including information identifying the vegetation region is generated.

In extraction processing S16 for a large-building candidate region, a candidate region of a large building having a height exceeding a predetermined height which exists within a ground region (recognition target region) to be subjected to processing of recognizing a building roof outline is extracted. On the other hand, in extraction processing S18 for a small-building candidate region, which is performed on a region excluding the large-building candidate region determined in the processing S16, a candidate region of a small building which is a low-rise building is extracted. In the processing S16 and the processing S18, a region at least a part of which is included within the region of a roof viewed from above is extracted as a candidate region of each building. That is, the candidate region does not always correspond to an entire area of the roof (or area in which the building exists), and is basically a region having a part that is included in the part of the roof region. In other words, the building candidate regions may be grasped as a marker (marker region) indicating a candidate position of the building rather than a candidate of the roof region itself.

In extraction processing S20 for a building region, the region of a building (building region) occupying the recognition target region is determined. In the processing S20, a region having the same attribute as the candidate region is determined by a region growing method using the building candidate region determined in the processing S16 and the processing S18 as a core. The region corresponding to the entire area of the roof region (roof candidate region) is thus extracted as the building region.

In shaping processing S22 for a building boundary, an edge fitting with an outer shape of the building region determined in the processing S20 is extracted from among edges appearing in the orthoimage, and a building boundary that is a periphery boundary of the building region is determined. The building boundary corresponds to an outline of the roof viewed from above.

In identification processing S24 for a small-building roof shape, a roof surface of a low-rise building for which the building candidate region is extracted in the processing S18 is distinguished between a flat roof formed of a flat roof surface and a slanted roof having a slanted surface.

In extraction processing S26 for a building roof structure line, with regard to the low-rise building judged in the processing S24 as having the slanted roof, a boundary between a plurality of roof surfaces that may be included in the slanted roof is extracted as a roof structure line based on the edges appearing in the orthoimage within the building boundary determined in the processing S22.

In construction processing S28 for a three-dimensional structure of the building roof outline, a three-dimensional structure of the roof outline of the slanted roof is constructed from the building boundary and the roof structure line.

Hereinafter, further description is given of each of the above-mentioned processing.

A DSM used in the normalizing processing S2 is generated by, for example, matching a plurality of aerial images having different camera position with each other and determining the height of an identical feature based on a difference in appearance of the identical feature in the plurality of aerial images. The DSM represents a height above sea level of a ground surface including features such as buildings and vegetation on the ground. In contrast, a DTM represents a height above sea level of a ground surface including no features. The DTM may be obtained by, for example, performing morphological filtering on the DSM represented by the DSM data 4. In the normalizing processing S2, the DTM data 6 is subtracted from the DSM data 4 for each point, to thereby eliminate an influence of the DTM included in the DSM, and the NDSM data 8 representing only the heights of the features is generated.

FIGS. 2(a) and 2(b) are schematic diagrams illustrating the normalization processing S2. FIG. 2(a) is a schematic diagram of a vertical section of the ground. A DSM 30 represents: horizontal coordinates/heights above sea level of feature surfaces of buildings 32 and 33, trees 34, and the like; and horizontal coordinates/heights above sea level of ground surfaces 36 exposed between the features. Here, the height above sea level of a building in the DSM 30 is a total sum of the height above sea level of the ground surface under the building and the height of the building. In the normalizing processing S2, a value of DTM 40 is subtracted from the value of the DSM 30 to generate an NDSM. FIG. 2(b) is a schematic diagram of a vertical section of NDSM 42 obtained in accordance with the ground of FIG. 2(a). In the NDSM 42, the features (buildings 32a and 33a and trees 34a) each include information on a height from a ground level, while a ground surface 36a basically has a height corresponding to a height of 0.

In the NDSM, the features other than the buildings also have a unique height, and in particular, the vegetation such as the trees 34a may have a height comparable to the buildings. Therefore, such features become noise factors in the extraction processing S16 and the extraction processing S18 for building candidate regions and other such processing. This is the reason for generating the vegetation region data 14 in the extraction processing S10 for a vegetation region which is used to exclude the vegetation region from the recognition target region of the building roof outline in the processing S16, the processing S18, or other such processing. For example, the vegetation region data 14 may be defined as an image data having the value "1" in the vegetation region and the value "0" in a non-vegetation region.

In a case where a multi-spectral image, formed of a plurality of components of red (R), green (G), blue (B), and near-infrared (NIR) is used as the orthoimage data 12, the vegetation region may be sensed owing to the properties of leaves of a tree that intensely reflect near-infrared light. For example, it is possible to judge as the vegetation region a region in which a normalized difference vegetation index (NDVI) calculated by the following equation using a pixel value $D_R$ of the R component and a pixel value $D_{NIR}$ of the NIR component is equal to or larger than a predetermined threshold value.

$$NDVI=(D_{NIR}-D_R)/(D_{NIR}+D_R)$$

Further, with regard to the judgment of the vegetation region, a smooth surface extends over a relatively large horizontal distance in a roof or a rooftop, while in a vegetation region, fluctuations occur in the height at relatively small spatial intervals. By using this difference, the vegetation region may also be distinguished. Specifically, it is possible to judge, as the vegetation region, a region in which a deviation of gradients among adjacent sampling points exceeds a predetermined threshold value. Further, it is also possible to distinguish based on a texture generated by the fluctuations in the height within an image taken from an aircraft or the like.

Further, with regard to the edges appearing in the orthoimage, the edge of the vegetation generally has a higher density than the edge of the building. This fact may also be used to judge the vegetation region.

Here, in this embodiment regarding the recognition of the building roof outline, by concurrently using the NDSM data 8 for the above-mentioned judgment of the vegetation region, it is possible to improve the accuracy of the judgment. For example, relatively high trees that are likely to be noise in the extraction processing S16 and the extraction processing S18 for building candidate regions may be suitably extracted as the vegetation region. Further, it is expected that the deviation of a green-planted roof will be small regardless of the height thereof. By using this property, the green-planted roof may be judged as a non-vegetation region and may also be prevented from being excluded from the recognition target region of the building candidate region.

In the extraction processing S16 for a large-building candidate region, the NDSM is sliced at a predetermined threshold value height as described above, and the region exceeding the threshold value height is extracted. By performing dilation/erosion the above-mentioned extracted region using morphological processing, a large-building candidate region is determined by eliminating a small region regarded as noise, separating an adjacent region, and excluding the vegetation region with reference to the vegetation region data 14.

FIGS. 3(a) to 3(c) are schematic diagrams illustrating the extraction processing S16 for a large-building candidate region. In FIG. 3(a), a level 50 of the threshold value height for the slicing is indicated in a schematic diagram illustrating a vertical section of an NDSM 42a corresponding to the NDSM 42 of FIG. 2(b). Here, the NDSM 42a indicated by the solid line of FIG. 3(a) depicts shapes of the features more smoothly than their actual shapes 52. In FIG. 2(b), the NDSM 42 is indicated by the shape conforming to the shape 52, but in actuality, in general, a resolution of the NDSM is not so high as to be able to capture the shape 52 satisfactorily. The NDSM 42a of FIG. 3(a) is indicated taking this into consideration.

FIG. 3(b) is a schematic image of the recognition target region representing a region exceeding the level 50. Note that in FIG. 3(b), the line segment A-A is a position of the section illustrated in FIG. 3(a). The image obtained after the slicing includes a vegetation region 54 in which regions 34b corresponding to the trees 34a are distributed as noise, in addition to regions 32b corresponding to the large buildings 32a. FIG. 3(c) is a schematic diagram of an image obtained after subjecting the image of FIG. 3(b) to the morphological processing and vegetation region excluding processing using the vegetation region data 14. The vegetation region 54 is eliminated, to thereby generate an image in which the regions 32b to be the large-building candidate region appear with high accuracy.

In the extraction processing S18 for a small-building candidate region, region segmentation processing (image segmentation) is performed on the NDSM from which the large-building candidate regions and the vegetation regions are excluded, to thereby extract a projecting portion having a height corresponding to a low-rise building among projecting portions appearing on the ground surface as the small-building candidate region. For example, in the NDSM data 8, processing of replacing data on the large-building candidate region and the vegetation region by the value "0" is performed, and the region segmentation processing is performed on the obtained NDSM. Examples of an algorithm for the region segmentation processing which may be used include watershed segmentation and marker-based watershed segmentation.

FIGS. 4(a) and 4(b) are schematic diagrams illustrating the extraction processing S18 for a small-building candidate region. FIG. 4(a) is a schematic diagram illustrating a vertical section of an NDSM 42b obtained after the NDSM 42a illustrated in FIG. 3(a) is subjected to processing of eliminating the buildings 32a extracted as the large-building candidate regions and the trees 34a forming the vegetation region 54. FIG. 4(b) is a schematic image of the recognition target region representing a result of subjecting the NDSM 42b to the watershed segmentation. Regions 56 corresponding to apex portions of projecting portions of the NDSM 42b corresponding to the low-rise buildings 33a are extracted as the small-building candidate regions within roof regions 58 of the buildings 33a.

Using the extraction processing S18 for a small-building candidate region, the respective positions of the plurality of low-rise buildings 33a that may exist in the recognition target region are grasped as the regions 56 that are separate from one another. In the identification processing S24 for a small-building roof shape, three-dimensional shapes of the roofs of the low-rise buildings 33a corresponding to the regions 56 are judged from the NDSM data 8 in the respective regions 56. Specifically, in the region 56, local surface normal vectors on a three-dimensional planes formed of a mesh defined by the NDSM data 8 are determined. For example, the normal vectors of each polygon forming the mesh are determined as the local surface normal vectors, and the roof is judged as a flat roof if directions of the local surface normal vectors are solely a vertical direction and as a slanted roof if most of the directions are distributed in directions inclined from the vertical direction. In that case, for example, if the direction of the local surface normal vector is expressed in the kind of spherical coordinates $(\alpha,\beta)$ illustrated in FIG. 5, the judgment between the flat roof and the slanted roof may be performed based on a histogram of the local surface normal vectors in an $\alpha\beta$-plane. Note that in FIG. 5, a vector N represents the local surface normal vector, a plane defined by an X-axis and a Y-axis in an orthogonal coordinate system represents the ground surface of the NDSM, and the positive direction of a Z-axis represents a vertically upward direction in terms of the ground surface. Further, the coordinate $\alpha$ represents an angle formed between the vector N and a ZX-plane, and the coordinate $\beta$ represents an angle formed between a projective vector S of the vector N on the ZX-plane and the upward direction of the Z-axis. According to the above-mentioned spherical coordinate system, if the vector N is a vertical direction, the vector N is positioned at the origin of the $\alpha\beta$-plane with $\alpha$ and $\beta$ both being zero, while the vector N is associated with a point spaced apart from the origin if inclined from the vertical direction. FIGS. 6(a) and 6(b) are schematic diagrams illustrating examples of a two-dimensional histogram in the $\alpha\beta$-plane. In FIG. 6(a), which illustrates a frequency distribution of the local surface normal vectors in a case of the flat roof, a frequency in this case is high in a region 70 formed of the origin of the $\alpha\beta$-plane and its vicinity. In FIG. 6(b), which illustrates an example of the frequency distribution of the local surface normal vectors in a case of the slanted roof, the frequency in this case is high in a region 72 spaced apart from the origin of the $\alpha\beta$-plane. Therefore, for example, by binarizing the two-dimensional histogram by a predetermined threshold value in terms of the frequency, the flat roof and the selected roof may be distinguished based on whether the region exceeding the threshold value exists at the origin or at a position spaced apart from the origin.

Figure 7:
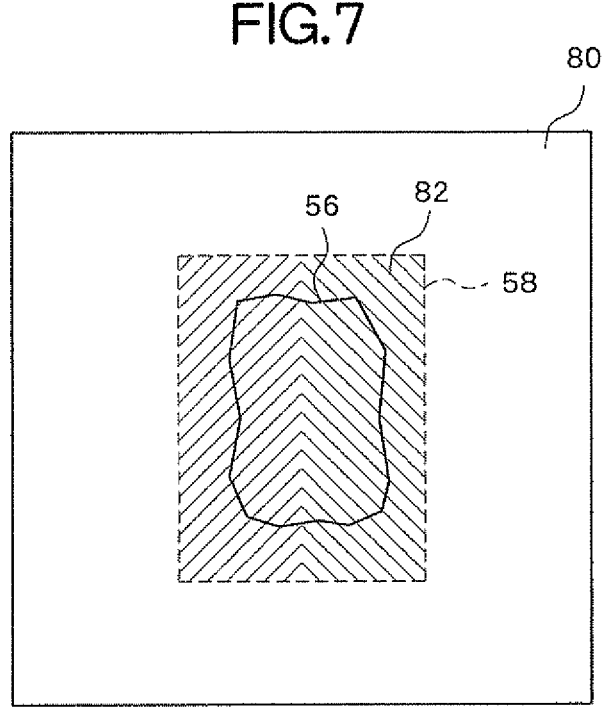
FIG. 7 A schematic diagram displaying a building candidate region overlaid on an orthoimage of a low-rise building.
Figure 8:
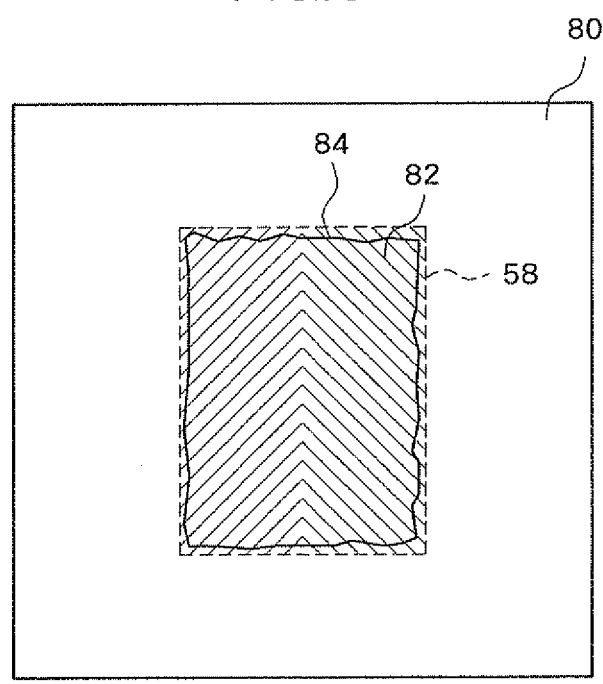
FIG. 8 A schematic diagram displaying a building region overlaid on the orthoimage of the low-rise building.

In the extraction processing S20 for a building region, with the building candidate region determined in the processing S16 and the processing S18 being used as the core (marker), the building region is extracted using the region growing method by using height information indicated by the NDSM data 8 and color information and texture information on the image obtained from the orthoimage data 12. Specifically, of the regions contiguous to the building candidate region, the region within a range having commonality in the height, color, and texture with the building candidate region is coupled to the building candidate region and set as the building region. FIGS. 7 and 8 are schematic diagrams illustrating the extraction processing S20 for a building region. FIG. 7 illustrates the building candidate region (region 56), which is extracted in the extraction processing S18 for a small-building candidate region, overlaid on an orthoimage 80. Note that the low-rise building 33a having a gable roof is depicted in the orthoimage 80, an image 82 of the roof surface within the orthoimage 80 is indicated by the hatch lines, and the dotted line surrounding the image 82 indicates that the range of the roof surface corresponds to the above-mentioned roof region 58. FIG. 8 illustrates a building region 84, which is obtained by region growing processing using the region 56 as the marker, overlaid on the orthoimage 80.

By thus using the region growing method in which the NDSM data 8 and information on the orthoimage data 12 are combined with each other, it is possible by automatic processing using an arithmetic processing device such as a computer to distinguish whether or not a target is the building region with high accuracy, and to suitably extract the building region.

Here, as illustrated in FIG. 8, the building region 84 may suitably cover the roof region 58, but because of the nature of the region growing method, the outline of the building region 84 does not always precisely match the outline (periphery boundary) of the roof region 58 indicated by the dotted line. In the shaping processing S22 for a building boundary, which is processing of determining the periphery boundary fitting with the building region, the edge fitting with the outer shape of the building region determined in the processing S20 is extracted from among the edges appearing in the orthoimage, and the building boundary which is the periphery boundary is determined. FIG. 9 is a schematic diagram illustrating the shaping processing S22 for a building boundary. FIG. 9 illustrates a building boundary 86 extracted in accordance with the building region 84 of FIG. 8.

In the extraction processing S26 for a building roof structure line, which is performed on the low-rise building having the slanted roof, the edges/line segments are extracted from the orthoimage within the building boundary with reference to the height information obtained from the NDSM data 8, and the extracted edges/line segments are further subjected to coupling, vertex decision, and the like, to thereby determine the roof structure line which is the boundary between a plurality of roof surfaces that may be included in the slanted roof. FIG. 10 is a schematic diagram illustrating the extraction processing S26 for a building roof structure line. Here, the image 82 of the roof surface includes two regions 82a and 82b that are different from each other in the directions of hatch lines, and those regions 82a and 82b correspond to the two roof surfaces that form a gable roof. The difference in the directions of hatch lines expresses that a contrast occurs between the region 82a and the region 82b on the orthoimage based on the difference in the directions of the respective corresponding roof surfaces. FIG. 10 illustrates that the boundary where the regions 82a and 82b are in contact with each other is extracted as the roof structure line 88 based on the contrast and color information on the regions 82a and 82b.

Figure 11:
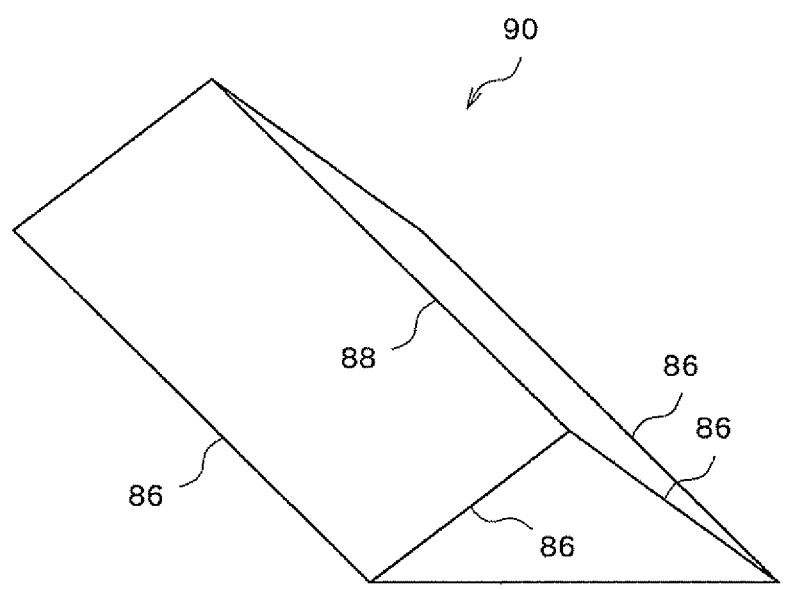
FIG. 11 A schematic perspective view illustrating a three-dimensional structure of a building roof outline constructed of a periphery boundary and a roof structure line.

In the construction processing S28 for a three-dimensional structure of the building roof outline, a three-dimensional structure of the roof outline of the slanted roof is constructed from the building boundary and the roof structure line. In this processing, the periphery boundary and the roof structure line are overlapped with each other, and the positions of connected/intersected points thereof are decided. In addition, in consideration of information on the three-dimensional shape of the roof, the three-dimensional structure of the building roof outline is decided from a two-dimensional graphic pattern obtained by combining the periphery boundary and the roof structure line. Note that the three-dimensional shape of the roof may be estimated from basic types such as a gable type and a hipped roof type and the shape of the roof region formed by the periphery boundary. FIG. 11 is a schematic perspective view illustrating a three-dimensional structure 90 of the building roof outline which is constructed of the periphery boundary 86 of FIG. 9 and the roof structure line 88 of FIG. 10. Note that the degree of irregularities formed in the roof surface may be defined based on the NDSM data 8 and inclination information (angles $\alpha$ and $\beta$) on the roof that may be obtained in the processing S24.

The above-mentioned recognition method for the building roof may be implemented as a program executed on the computer. By executing the program, the computer may automatically perform: the grasping of the position of the building existing in the recognition target region based on the DSM data 4 captured from an aircraft or the like and the orthoimage data 12; the identification of the building region; the recognition of the building roof outline; and the construction of the three-dimensional structure thereof. Further, the building roof outline recognition device according to the present invention is implemented by, for example, the computer executing the program.

Further, the above-mentioned embodiment is described according to an aspect using an image taken from an aircraft or the like and the DSM generated from the image, but an image captured by a high-resolution satellite and the DSM may be used instead. Further, the DSM may be acquired by emitting laser onto the ground from an aircraft or the like.

The invention claimed is:

1. A building roof outline recognition device, comprising:
    a marker region extraction unit for extracting a region having at least a part thereof included in a roof as a marker region for each building from a recognition target region of a building roof outline based on surface data that is captured from above and that represents a height above sea level of a ground surface including a feature;
    a roof candidate region extraction unit for extracting, as a roof candidate region, a region having commonality with the marker region with regard to the surface data and an aerial photograph image, using a region growing method with the marker region set as a core; and
    a periphery boundary shaping unit for extracting an edge fitting with an outer shape of the roof candidate region from among edges appearing in the aerial photograph image, and determining a periphery boundary that is the building roof outline.

2. The building roof outline recognition device according to claim 1, wherein the roof candidate region extraction unit judges presence/absence of the commonality based on the surface data and color information and image texture information included in the aerial photograph image, and determines the roof candidate region.

3. The building roof outline recognition device according to claim 1, wherein the marker region extraction unit performs region segmentation processing of extracting a projecting portion having a height corresponding to a low-rise building among projecting portions appearing on the ground surface as the marker region by region segmentation using a watershed method based on the surface data.

4. The building roof outline recognition device according to claim 3, further comprising:
    a roof shape distinguishing unit for distinguishing the roof of each building between a flat roof formed of a flat roof surface and a slanted roof having a slanted surface based on the surface data on the projecting portion corresponding to each building for which the marker region is extracted in the region segmentation processing;
    a roof structure line extraction unit for extracting, as a roof structure line, a boundary between a plurality of roof surfaces that may be included in the slanted roof based on edges appearing in the aerial photograph image within the periphery boundary for each building including the slanted roof; and
    a slanted roof outline construction unit for constructing a three-dimensional structure of the building roof outline of the slanted roof based on the periphery boundary and the roof structure line.

5. The building roof outline recognition device according to claim 3, wherein the marker region extraction unit comprises:
    a large-building region extraction unit for determining the marker region for a large building based on a region within the recognition target region, in which the surface data exceeds a predetermined threshold value, prior to the region segmentation processing; and
    a small-building region extraction unit for performing the region segmentation processing on a region within the recognition target region excluding the marker region for the large building, and determining the marker region for a small building that is a low-rise building at a height equal to or smaller than a height corresponding to the predetermined threshold value.

6. The building roof outline recognition device according to claim 1, further comprising a vegetation region extraction unit for extracting a vegetation region based on the aerial photograph image,
    wherein the marker region extraction unit performs each processing on a region excluding the vegetation region from the recognition target region.

7. The building roof outline recognition device according to claim 1, further comprising a normalizing processing unit for generating normalized surface data representing a height of the feature by subtracting a height above sea level of a ground surface excluding the feature from the surface data, wherein:
    the marker region extraction unit extracts the marker region based on the normalized surface data; and
    the roof candidate region extraction unit uses the normalized surface data for extracting the roof candidate region.

8. The building roof outline recognition device according to claim 4, wherein the marker region extraction unit comprises:
    a large-building region extraction unit for determining the marker region for a large building based on a region within the recognition target region, in which the surface data exceeds a predetermined threshold value, prior to the region segmentation processing; and a small-building region extraction unit for performing the region segmentation processing on a region within the recognition target region excluding the marker region for the large building, and determining the marker region for a small building that is a low-rise building at a height equal to or smaller than a height corresponding to the predetermined threshold value.

9. The building roof outline recognition device according to claim 2, further comprising a vegetation region extraction unit for extracting a vegetation region based on the aerial photograph image, wherein the marker region extraction unit performs each processing on a region excluding the vegetation region from the recognition target region.

10. The building roof outline recognition device according to claim 3, further comprising a vegetation region extraction unit for extracting a vegetation region based on the aerial photograph image, wherein the marker region extraction unit performs each processing on a region excluding the vegetation region from the recognition target region.

11. The building roof outline recognition device according to claim 4, further comprising a vegetation region extraction unit for extracting a vegetation region based on the aerial photograph image, wherein the marker region extraction unit performs each processing on a region excluding the vegetation region from the recognition target region.

12. The building roof outline recognition device according to claim 2, further comprising a normalizing processing unit for generating normalized surface data representing a height of the feature by subtracting a height above sea level of a ground surface excluding the feature from the surface data, wherein:

the marker region extraction unit extracts the marker region based on the normalized surface data; and the roof candidate region extraction unit uses the normalized surface data for extracting the roof candidate region.

13. The building roof outline recognition device according to claim 3, further comprising a normalizing processing unit for generating normalized surface data representing a height of the feature by subtracting a height above sea level of a ground surface excluding the feature from the surface data, wherein:

the marker region extraction unit extracts the marker region based on the normalized surface data; and the roof candidate region extraction unit uses the normalized surface data for extracting the roof candidate region.

14. The building roof outline recognition device according to claim 4, further comprising a normalizing processing unit for generating normalized surface data representing a height of the feature by subtracting a height above sea level of a ground surface excluding the feature from the surface data, wherein:

the marker region extraction unit extracts the marker region based on the normalized surface data; and the roof candidate region extraction unit uses the normalized surface data for extracting the roof candidate region.

15. A building roof outline recognition method, comprising:

a marker region extraction step of extracting a region having at least a part thereof included in a roof as a marker region for each building from a recognition target region of a building roof outline based on surface data that is captured from above and that represents a height above sea level of a ground surface including a feature;

a roof candidate region extraction step of extracting, as a roof candidate region, a region having commonality with the marker region with regard to the surface data and an aerial photograph image, using a region growing method with the marker region set as a core; and a periphery boundary shaping step of extracting an edge fitting with an outer shape of the roof candidate region from among edges appearing in the aerial photograph image, and determining a periphery boundary that is the building roof outline.

16. A non-transitory computer-readable medium having a building roof outline recognition program stored thereon, wherein the building roof outline recognition program causes a computer to execute:

a marker region extraction step of extracting a region having at least a part thereof included in a roof as a marker region for each building from a recognition target region of a building roof outline based on surface data that is captured from above and that represents a height above sea level of a ground surface including a feature;

a roof candidate region extraction step of extracting, as a roof candidate region, a region having commonality with the marker region with regard to the surface data and an aerial photograph image, using a region growing method with the marker region set as a core; and a periphery boundary shaping step of extracting an edge fitting with an outer shape of the roof candidate region from among edges appearing in the aerial photograph image, and determining a periphery boundary that is the building roof outline.

* * * * *